United States Patent
Beamish et al.

(10) Patent No.: US 6,304,642 B1
(45) Date of Patent: Oct. 16, 2001

(54) PEER-TO-PEER DATA TRANSFER USING PRE-EXISTING CALLER ID CLASS FSK SIGNALING INFRASTRUCTURE

(75) Inventors: Norman J. Beamish, Costa Mesa; Robert S. Saunders, Irvine; John S. Walley, Lake Forest; Raymond Hon Mo Yung, Irvine, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/328,048

(22) Filed: Jun. 8, 1999

(51) Int. Cl.[7] .............................. H04M 1/56; H04M 3/42
(52) U.S. Cl. .............................. 379/142.01; 379/142.04; 379/142.08; 379/215
(58) Field of Search ...................... 379/142, 201, 379/215, 88.11, 88.12, 88.13, 88.19, 88.2, 93.01, 93.17

(56) References Cited

U.S. PATENT DOCUMENTS

| | | | |
|---|---|---|---|
| 5,036,513 | * | 7/1991 | Greenblatt ........................... 370/125 |
| 5,524,141 | * | 6/1996 | Braun et al. ........................ 379/93 |
| 5,583,922 | * | 12/1996 | Davis et al. ........................ 379/96 |
| 5,583,924 | * | 12/1996 | Lewis ................................. 379/142 |
| 5,809,111 | * | 9/1998 | Matthews .......................... 379/31 |
| 5,812,534 | * | 9/1998 | Davis et al. ....................... 370/260 |
| 5,905,786 | * | 5/1999 | Hoopes ............................. 379/142 |
| 5,960,062 | * | 9/1999 | Chang et al. ..................... 379/67.1 |

FOREIGN PATENT DOCUMENTS

WO 98/15095 * 4/1998 (WO) .............................. H04M/1/56
WO 99/31857   6/1999 (WO) .

OTHER PUBLICATIONS

"Overview of ADSI Technical Analysis and Testing Services", Telcordia Technologies, at http:/www.telcordia.com/solutions/optimize/csbt/ast–analysis.html.

"ADSI Technical Overview", Bellcore, at http://www-.bellcore.com/solutions/optimize/csbt/dsi–engineering.html.

"Next Generation AST–ADSI Technical Services Overview", Bellcore, at http://www.bellcore.com/solutions/optimize/csbt/ast–services.html.

"Next Generation AST–ADSI Technical Specifications", Bellcore, at http://www.bellcore.com/solutions/optimize/csbt/ast–grs.html.

"Advanced Screen Telephony Analog Display Services Interface", Bellcore, at http://www.astadsi.com/prod01.htm.

* cited by examiner

Primary Examiner—Curtis Kuntz
Assistant Examiner—Quoc D. Tran
(74) Attorney, Agent, or Firm—Lyon & Lyon LLP

(57) ABSTRACT

A communications device configured to receive FSK-encoded CLASS caller ID information is also configured to exchange FSK-encoded data with a peer device over a channel previously established between the two devices. In one embodiment, the channel is a voice channel previously established between the two devices.

20 Claims, 12 Drawing Sheets

Key

PSTN: Public Switched Telephone Network
CPE: Customer Premises Equipment
ADC: Analog to Digital Converter
DAC: Digital to Analog Converter
FSK: Frequency Shift Keying
CAS: CPE Alert Signal

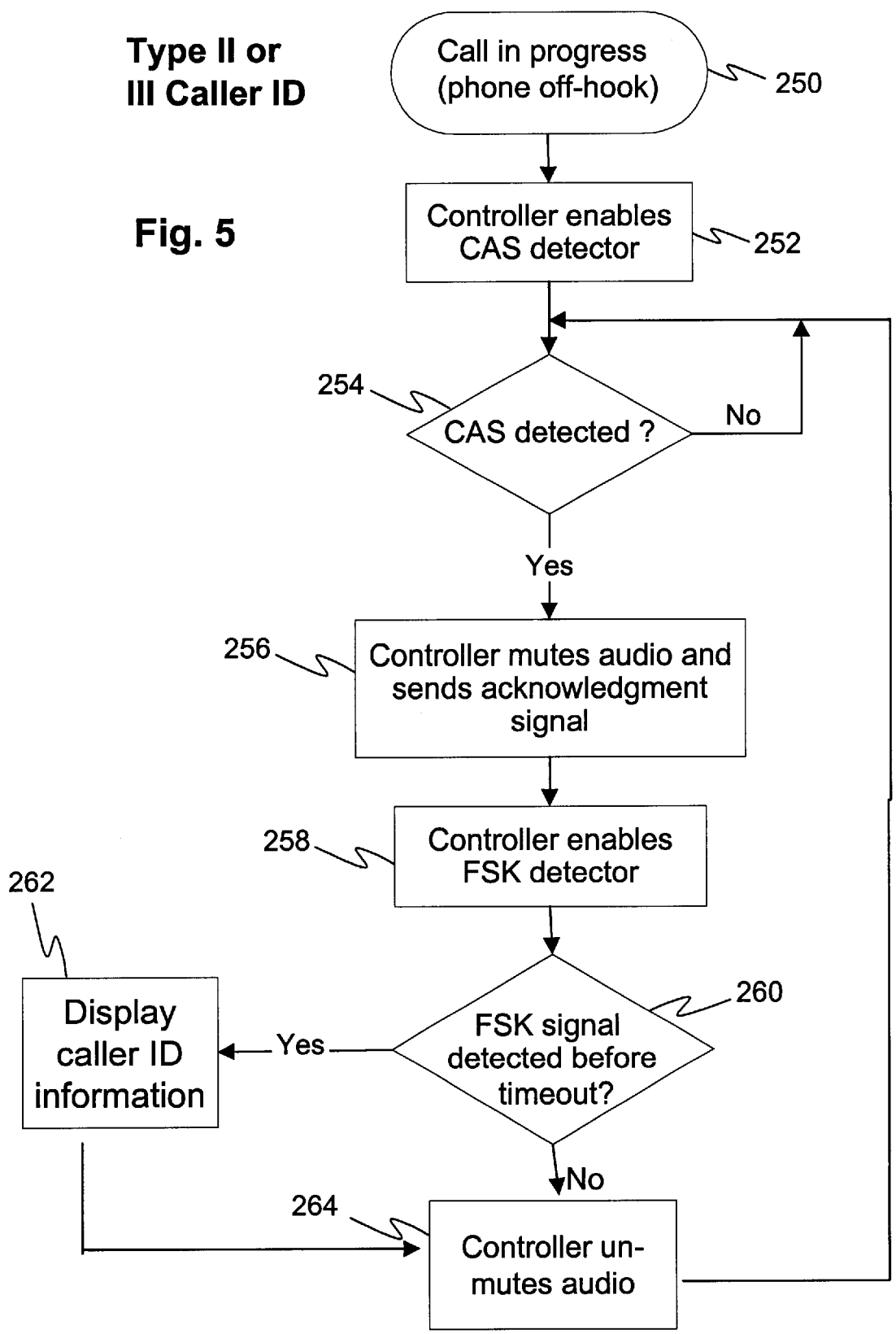

PEER-TO-PEER DATA TRANSFER USING PRE-EXISTING CALLER ID CLASS FSK SIGNALING INFRASTRUCTURE

BACKGROUND OF THE INVENTION

1. Field of the Invention

This invention relates generally to a method and apparatus for data transfer using FSK signals and in particular to peer to peer data communication using pre-existing caller ID CLASS FSK signaling infrastructure.

2. Background

Introduction of SS7 switching in central office switching systems provided the technological capability to introduce caller ID services to customers. Caller ID services utilize the ability of a modern call switching and routing system, referred to in the telecommunications industry as a Stored Program Control System (SPCS), to record and provide to a call recipient information regarding the calling party in a Calling Party Number Message (CPN Message). This information, commonly referred to as caller ID information, may comprise the calling party's telephone number or name.

Telephones capable of displaying caller ID information are increasingly common. In fact, caller ID services are one of a group of network-provided enhanced services known as custom local area signaling services (CLASS). Telecordia Technologies, Inc., Morristown, N.J., originally Bellcore, has defined three classes of caller ID services, known respectively as Type I, Type II, and Type III. In the Type I service, a phone is equipped with a Frequency Shift Key (FSK) detector, a controller, and a display. When a call is placed to the phone, a SPCS server situated within the Public Switched Telephone Network (PSTN) activates a corresponding FSK generator also situated within the PSTN to transmit to the phone a FSK signal encoding the caller ID information. At the phone, as indicated in FIG. 1, when a first ring is detected, step 100, the controller enables the FSK detector, step 102, which listens for a FSK signal. If a FSK signal is detected before the second ring, the Yes branch of decision point 104, it is demodulated to obtain the caller ID information. That information is then displayed, step 106. If, however, the FSK signal is not detected before the second ring, the No branch of decision point 104, the FSK detector is disabled, step 110.

In the Type II or Type III service, a phone is also equipped with a Customer Premises Equipment Alerting Signal (CAS) detector. When a call is placed to the phone, as illustrated in FIG. 5, the SPCS server first determines if the phone is on-hook or off-hook. If on-hook, the procedure described for the Type I category of service is followed. If off-hook, step 250, a call waiting/caller ID service is provided in which the server first activates a corresponding CAS generator situated within the PSTN to generate and transmit a CAS signal to the phone, step 252. The CAS detector at the phone, which has been previously enabled by the controller upon the occurrence of the off-hook condition, listens for the CAS signal, indicated by the No loopback to the beginning of decision point 254. Upon detecting the CAS signal, indicated by the Yes branch of decision point 254, the controller mutes the audio channel at the phone, step 256, and sends a Dual Tone Multi-Frequency (DTMF) tone, which serves as an acknowledgement signal. In the case of a Type II unit, the acknowledgement signal is a DTMF 'D' tone; in the case of a Type III unit, the acknowledgement signal is a DTMF 'A' tone. Muting of the audio channel is required since the FSK signal in one implementation is transmitted at a range of frequencies, 500–2500 Hz, which is within the audio band of 0 to about 3000 Hz.

The controller then enables the FSK detector, step 258, which listens for an FSK signal. If a FSK signal is detected before a predetermined timeout period, indicated by the Yes branch of decision point 260, the FSK signal is demodulated and the caller ID information obtained and displayed, step 262. If there is a timeout before the FSK signal is detected, indicated by the No branch of decision point 260, the controller un-mutes the audio channel, step 264, and resumes listening for a CAS signal, indicated by the branch from block 264 to the beginning of decision point 254.

As indicated, the process for the Type III service is identical to that of the Type II category, except that the acknowledgement signal is a DTMF 'A' tone. This identifies the Customer Premises Equipment (CPE), that is, the phone, as a Type III unit.

An Analog Display Services Interface (ADSI) is a Telecordia-defined interface and related protocol for bi-directional transmission of data between a SPCS server and an ADSI-compatible phone. The interface is such that an ADSI-compatible phone is backward compatible with a Type III phone. Data transmission to the phone is achieved via the FSK receiver already present in the phone. In early embodiments, data transmission from the phone was achieved by DTMF tones. In later embodiments, a FSK generator was added to a Type III phone, and data transmission from the phone originated from the FSK generator.

The class of services which can be supported through the ADSI is limited to those services which involve communication between a SPCS server and an ADSI-compatible phone, such as the transmission or reception of e-mail messages. However, services involving peer-to-peer communication, that is, direct communication between two CPEs, is not supported by the ADSI even though such services are desirable and unmet by the services supported by the ADSI interface.

Furthermore, it would be desirable to offer such services using the existing infrastructure for caller ID and ADSI services to the extent possible.

Therefore, a need exists for a data communication mechanism that allows peer-to-peer transmission of data over a telecommunications network using the existing infrastructure for CLASS Caller ID FSK signals.

SUMMARY OF THE INVENTION

In accordance with the purpose of the invention as broadly described herein, there is provided a method and apparatus for transmitting data between peer CPEs over a telecommunications network using the Caller ID CLASS FSK signaling infrastructure. In one implementation, the telecommunications network is a telephone network such as the PSTN.

In one embodiment, a CPE is a device known as a dataphone. In one implementation, the dataphone is an ADSI-compatible telephone to which is added a CAS generator. In another implementation, the dataphone is a Type II or Type III phone to which is added an FSK generator and a CAS generator.

However derived, the dataphone includes a CAS detector, an FSK receiver, a CAS transmitter, an FSK transmitter, a controller, and a display configured to provide peer-to-peer data communication functionality. In one implementation, these components are also configured to provide ADSI-compatible functionality. In a second implementation, these components are also configured to provide Type II or Type III caller ID functionality. In one implementation, the dataphone further includes a CODEC, a user interface such as a keypad, and a storage device, such as computer memory accessible by the controller.

The CAS generator is configured to generate a CAS signal upon being enabled by the controller. The CAS detector is configured to detect an incoming CAS signal from a calling dataphone upon being enabled by the controller. The FSK generator, upon being enabled by the controller, is configured to transmit to a target dataphone information in the form of FSK signals. The FSK receiver, upon being enabled by the controller, is configured to receive incoming FSK signals from a calling dataphone, and demodulate the same to provide the underlying information.

A peer-to-peer data communication proceeds as follows, it being assumed that a call has previously been made by the calling dataphone to a target dataphone, and a circuit established between the two over the telecommunications network (which in one implementation is the PSTN) upon the target phone being place in an off-hook condition. Accordingly, it is further assumed that the CAS detector of the target dataphone has been enabled in accordance with Type II or Type III functionality.

First, a CAS signal is generated by the CAS generator in the calling dataphone and directed to the target dataphone over the link which has previously been established between the two. Second, the CAS signal is detected by the CAS detector in the target dataphone, and an acknowledgement signal sent back to the calling dataphone acknowledging receipt of the CAS signal. The CAS signal alerts the target dataphone that a data transmission is about to occur. Third, upon receipt of the acknowledgment, the information to be transmitted is encoded into an FSK format by the FSK generator in the calling dataphone, and transmitted to the target dataphone over the link which has been previously established. In one implementation, consistent with the Type II, Type III, and ADSI-compatible protocols, transmission between the two units occurs at frequencies within the voice band. In one implementation example, these frequencies range from 500–2500 Hz. In another implementation, these frequencies range from 1000–2200 Hz.

In one implementation, a message type byte is included in the information stream identifying the stream as originating from a calling dataphone in contrast to an SPCS server as per the standard ADSI protocol. This is consistent with the ADSI protocol, which permits manufacturer-specific message types.

Fifth, the FSK signals are received and demodulated by the target dataphone, thus establishing the link between the calling and target dataphones. Moreover, the message type byte is detected, thus signaling the target dataphone that the information has originated from a calling dataphone rather than a SPCS server. At this point, the protocol for exchanging information may deviate from that specified by the ADSI protocol.

In one mode of operation, referred to as the simplex mode of operation, data transmission occurs one way from the calling dataphone to the target dataphone. In this mode of operation, the calling dataphone may continue to transmit data to the target dataphone in accordance with a protocol understood by both parties. In this mode of operation, when the calling dataphone has completed data transfer, the FSK link is broken, and the call between the two dataphones over the telecommunications network is terminated.

In a second mode of operation, referred to as a half duplex mode of operation, data transmission from the calling dataphone to the target dataphone occurs as in the simplex mode of operation, but, after this is completed, the calling dataphone enables its FSK receiver, and the target dataphone then begins transmitting data to the calling dataphone. The two can then alternate data transmission to one another indefinitely, until either unit breaks the link, thus terminating the call.

In a third mode of operation, full duplex transmission occurs.

In a second embodiment, data transmission between the two units occurs independent of the telecommunication network, and over an acoustical channel. In this embodiment, consistent with the Type II, Type III, and ADSI-compatible protocols, information is transmitted between the two units at frequencies within the voice band. In one implementation, these frequencies range from 500–2500 Hz. In another implementation, they range from 1000–2200 Hz. The acoustical channel comprises the speaker/earpiece of the originating dataphone, and extends through the air to the microphone of the destination dataphone. The information is converted to FSK signals by the FSK generator of the originating dataphone. It is then converted to an acoustic signal by the speaker/earpiece of the originating dataphone, and transmitted over the air. The acoustic signal is received by the microphone of the destination dataphone, which converts it back into electrical FSK signals. These electrical signals are then processed as in the first embodiment. Compared to the first embodiment, the two dataphones do not need to be in an off-hook condition to establish the link, although the speaker/earpiece of the originating dataphone and the microphone of the destination dataphone do generally need to be in a line-of-sight relationship.

In a third embodiment, a CPE is any device which is capable of placing calls to other similarly disposed units over a telecommunication network such as the PSTN, which further has a CAS generator and detector, and a FSK generator/detector, and which is configured to communicate FSK-encoded data over a pre-established link with a similarly disposed device. Such devices may include laptops, desk top computers, and palm pilots.

In a fourth embodiment, the calling and target CPEs are each a wireless communication device, such as a mobile handset, which further has a CAS generator and detector, and a FSK generator and detector, and which is configured to communicate FSK-encoded data over a predefined wireless link with a similarly disposed device.

BRIEF DESCRIPTION OF THE DRAWINGS

FIG. 5 illustrates a method of operation of a Type II/Type III Caller ID CLASS phone.

DETAILED DESCRIPTION OF THE PREFERRED EMBODIMENTS

1. Background

The following Acronym Definition Table defines the acronyms that are used throughout the following disclosure.

Acronym Definition Table

| Acronym | Definition |
| --- | --- |
| ADSI | Analog Display Services Interface |
| CAS | CPB Alerting Signal |
| CLASS | Custom Local Area Signaling Service |
| CPE | Customer Premises Equipment |
| CPN Message | Calling Party Number Message |
| DTMF | Dual Tone Multi-Frequency |
| FSK | Frequency Shift Keying |
| PSTN | Public Switch Telephone Network |
| Caller ID | Caller Identification |
| SPCS | Stored Program Controlled System (central office switch or server) |

2. Example Environment

Figure 1:
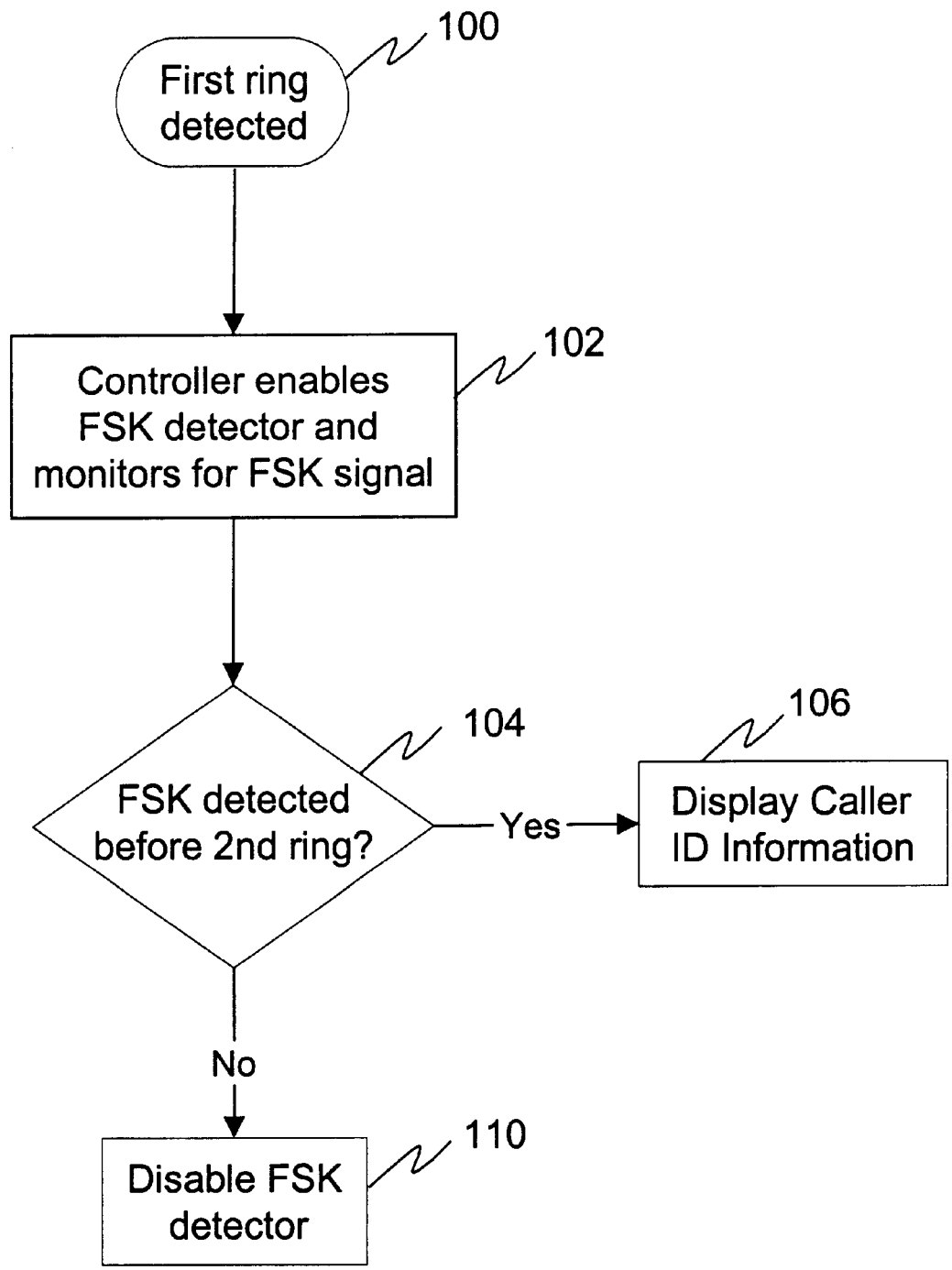
FIG. 1 illustrates a method of operation of a Type I Caller ID CLASS phone.
Figure 2:
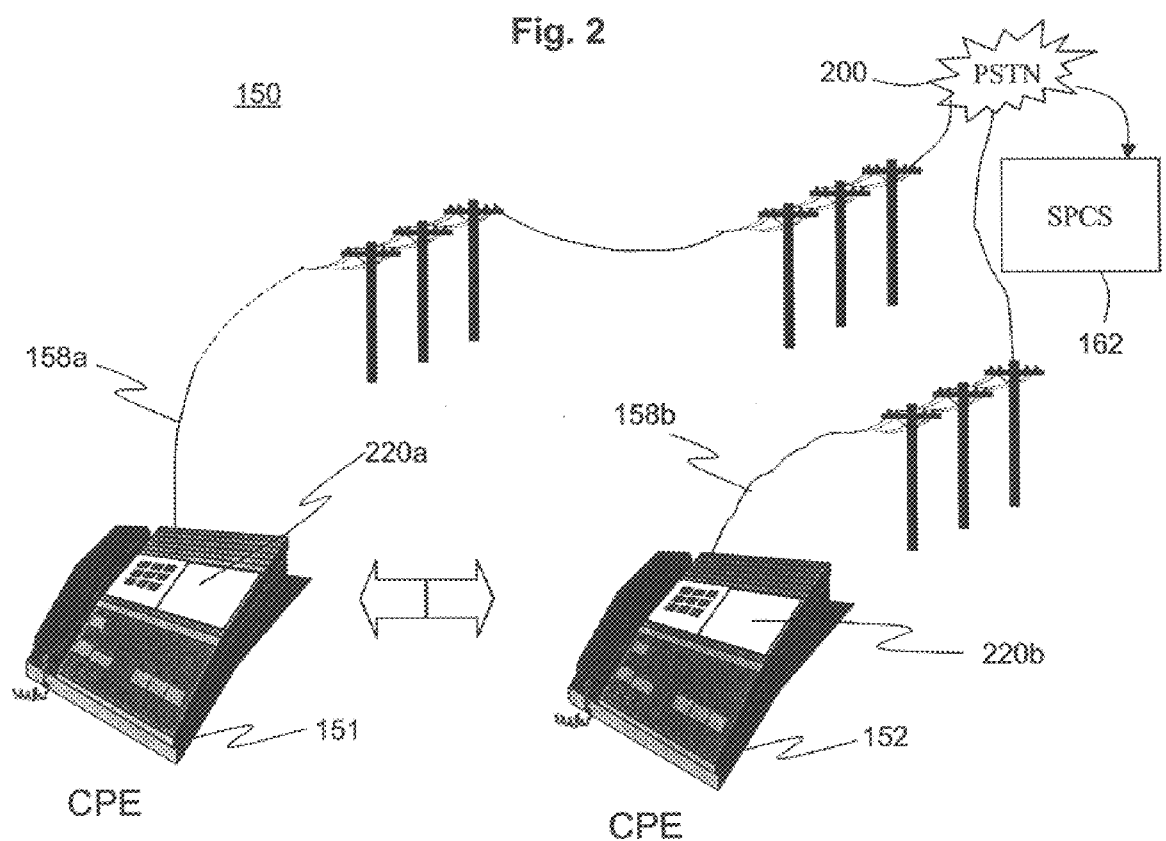
FIG. 2 illustrates an example environment of one embodiment of the subject invention.

As illustrated in FIG. 2, an example environment for the subject invention is a telecommunications network 150 linking two or more CPEs 151, 152. CPE 151 is linked to the PSTN 200 over line 158a, and CPE 152 is linked to the PSTN 200 over lines 158b. Included within the PSTN is an SPCS server, identified with numeral 162. Each of the CPEs 151, 152 is configured with a display 220a, 220b.

Each of the CPEs is configured with a CLASS Caller ID capability in which each unit is configured to receive CLASS Caller ID signals from SPCS server 162, to decode the signals to obtain the underlying information, and display the information on displays 220a, 220b.

In one implementation, each CPE 151, 152 is a Type II or Type III unit, that is, a unit configured with a CAS detector and a FSK receiver which are configured to 1) detect and acknowledge a CAS signal from SPCS server 162; 2) thereafter detect CLASS Caller ID FSK signals originating from the SPCS server 162; and 3) display the caller ID information, all in accordance with the previously discussed Type II and Type III procedures (see FIG. 5 and the related text for a description of the Type II and Type III procedures).

In a second implementation, each CPE 151, 152 is an ADSI-compatible unit, that is, a unit configured with a CAS detector, an FSK receiver, and an FSK generator, which are configured to 1) detect and acknowledge a CAS signal from SPCS server 162; 2) thereafter detect CLASS Caller ID FSK signals originating from SPCS server 162; 3) display the caller ID information, all in accordance with the previously discussed Type III procedures; and 4) exchange information encoded in the form of CLASS FSK signals with SPCS server 162 in accordance with ADSI-interface protocols.

The CPE can be any device configured to provide CLASS caller ID functionality, including a telephone, laptop, palm pilot, handset, and dataphone (to be described in the next section).

3. First Embodiment

Figure 3:
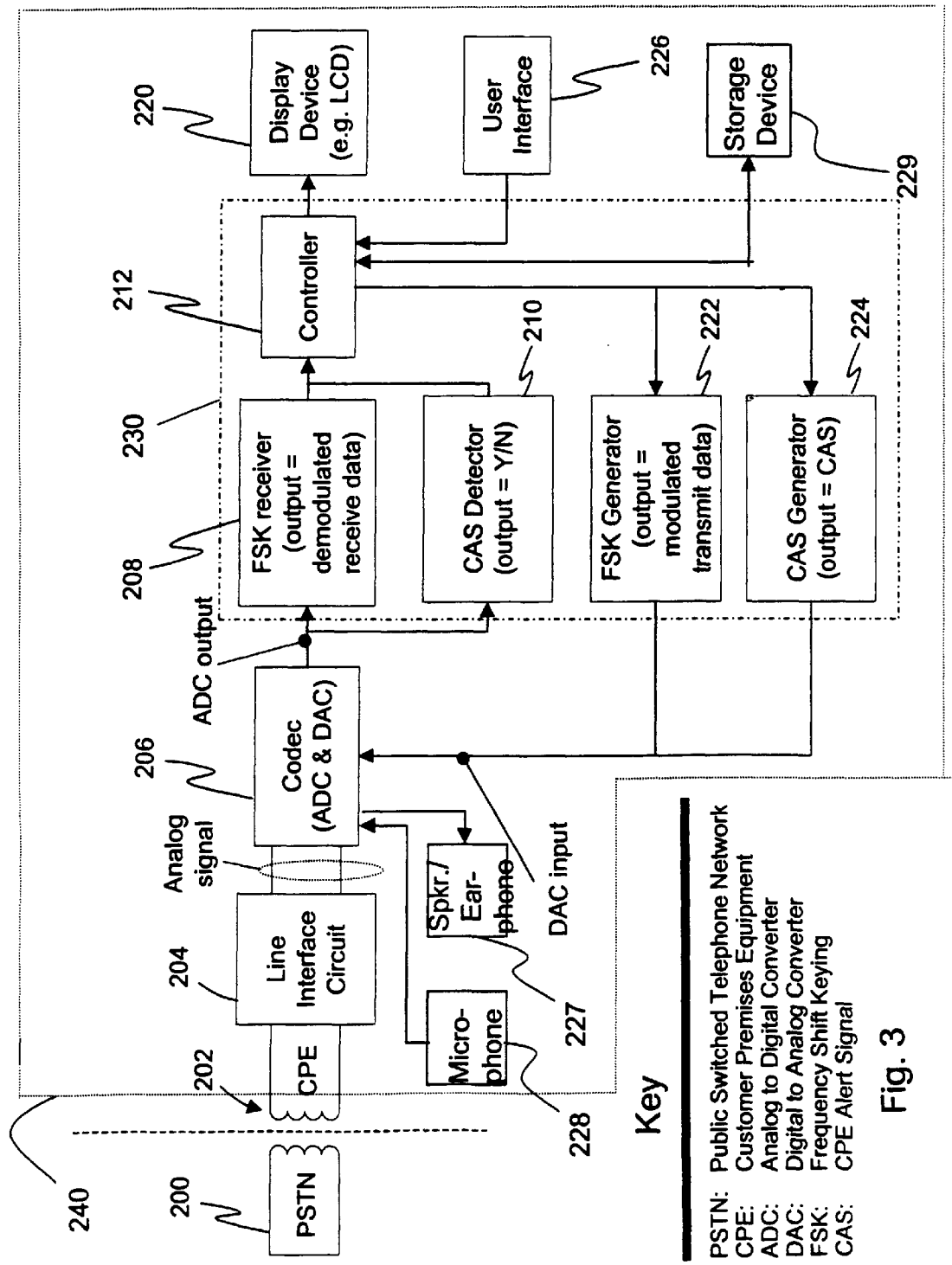
FIG. 3 illustrates a block diagram of a first embodiment of a dataphone of the subject invention.

In accordance with a first embodiment of the subject invention, a CPE is a device known as a dataphone, an embodiment of which is illustrated in FIG. 3. In general, a dataphone is a telephone which is equipped to communicate FSK-encoded data with another dataphone over a telecommunication network such as the PSTN using the pre-existing CLASS Caller ID functionality. As shown, in one embodiment, dataphone 240 comprises line interface circuit 204, CODEC 206, FSK receiver 208, CAS detector 210, FSK generator 222, CAS generator 224, controller 212, display 220, speaker/earphone 227, and microphone 228. Optionally, user interface 226 and storage device 229 are also provided as shown.

The dataphone is configured to provide CLASS caller ID functionality. In one implementation, the dataphone provides Type II functionality; in a second implementation, Type III functionality; in a third implementation, ADSI-compatible functionality, which includes Type III functionality. In addition, the dataphone is configured to provide the voice communication capability of a standard telephone. CODEC 208 includes both an A/D Converter (ADC) for digitizing and decoding incoming analog signals received from line interface circuit 204, and a D/A converter (DAC) for coding digitized signals received from FSK generator 222 or CAS generator 224, and then putting these signals into analog form.

Figure 7:
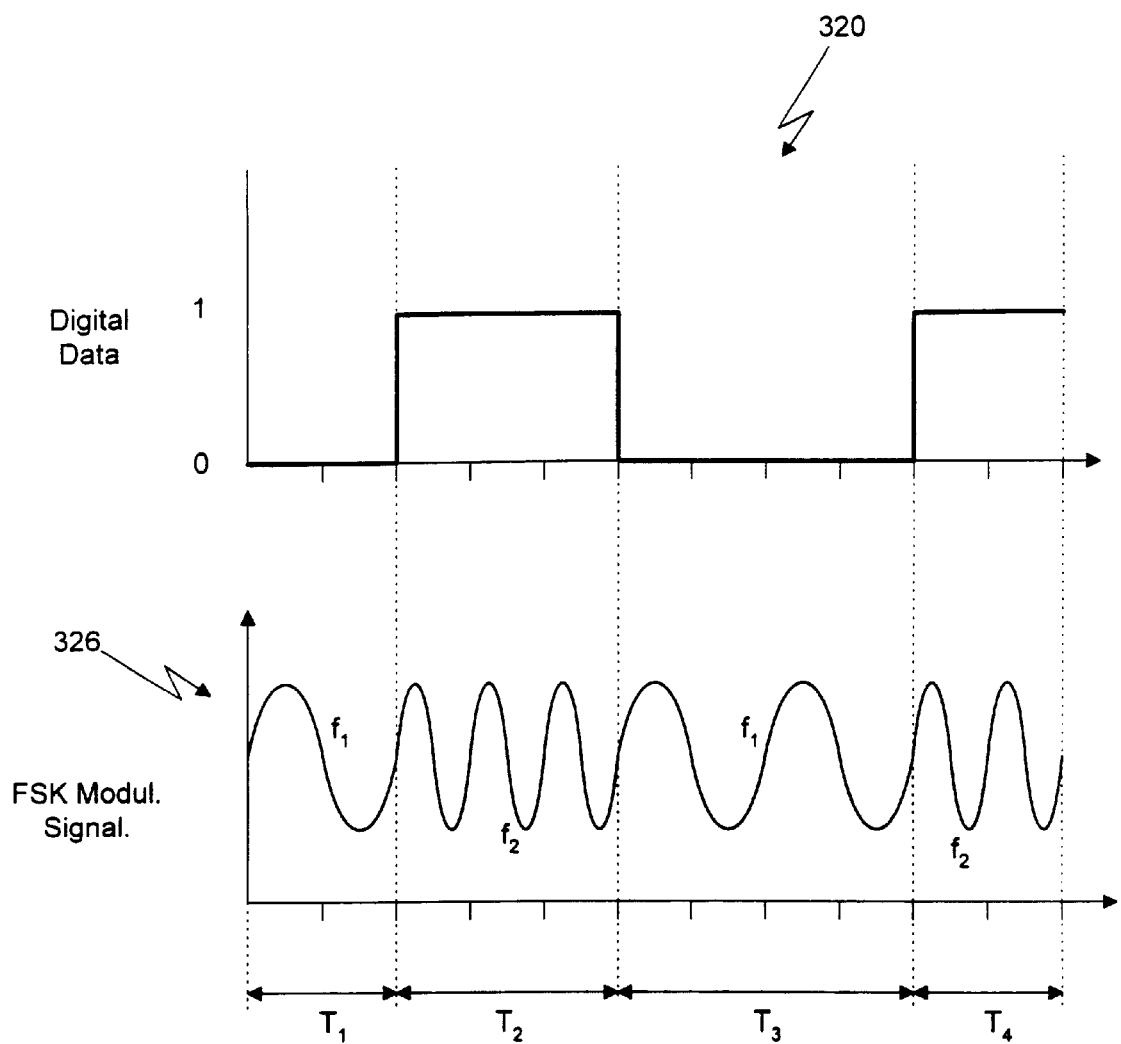
FIG. 7 illustrates an FSK modulated signal.

FSK receiver 208 is configured to receive and demodulate FSK signals. As illustrated in FIG. 7, a binary FSK signal 328 has a frequency dependent on the state of a modulating signal 320. Thus, if modulating signal 320 is a binary '0', the FSK modulated signal has a frequency $f_1$, and if the modulating signal 320 is a binary '1', the FSK modulated signal has a frequency $f_2$ which is different from $f_1$. In the example shown, the frequency $f_2$ is greater than $f_1$.

As shown, in time periods $T_1$ and $T_3$, when the modulating signal is a binary '0', the frequency of modulated signal 326 is $f_1$, while in time periods $T_2$ and $T_4$, when the modulating signal is a binary '1', the frequency of modulated signal 326 is $f_2$.

An M-ary FSK signal is also possible, in which the frequency of the signal is capable of having one of M values, $f_1, f_2, \ldots, f_M$, depending on the state of modulating signal 320, which can take on one of M values. Additional information on FSK modulated signals is available in B. Sklar, "Digital Communications Fundamentals and Applications," Prentice-Hall, 1988, which is hereby fully incorporated by reference herein as though set forth in full. FSK receiver 208 receives a FSK signal and demodulates it to provide the modulating signal.

CAS detector 210 is configured to detect a CAS signal upon being actuated by controller 212. In one implementation, a CAS originating from a SPCS server comprises a dual tone 80 millisecond signal at a power level of −15 dB per tone, and a CAS originating from a CPE is increased to greater than the −15 dB per tone to compensate for the increase in distance which the signal must travel before detection. In one implementation example, the dual tones of the CAS comprise a combination of a first tone at 2130 Hz and a second tone at 2750 Hz.

FSK generator 222 is configured to generate an FSK-modulated signal from a modulating signal provided by controller 212. The FSK-modulated signal is at a frequency which is within the voice band of 300–3400 Hz. Such allows the data communication between two dataphones to occur over the same circuit which is established between the two units after a call is placed from one unit to the other. In one implementation, the frequency of the FSK-encoded transmission is between 500–2500 Hz. In a second implementation, the frequency of the FSK-encoded transmission is between 1000–2200 Hz. In one implementation example, the frequency of transmission is 1200 bps. CAS generator 224 is configured to generate a CAS signal upon being actuated by controller 212.

The display device 220 comprises a LCD display, although in other configurations, it may comprise a CRT display, thin film transistor or plasma technology display, or other suitable display device.

Controller 212 is configured to direct the overall operation of dataphone 240. It can be implemented in a variety of forms, such as a processor, a microprocessor, a microcontroller, a digital signal processor (DSP), or an ASIC. For purposes of this disclosure, a processor is any device configured to perform a series of tasks responsive to discrete instructions stored in a memory accessible by the processor.

User interface 229 is any suitable means for inputting information into the dataphone, such as a keypad, keyboard, mouse, touch-screen, voice-activation means, or the like.

Storage device 229 is any device capable of storing data or instructions, such as RAM, ROM, EEPROM, EPROM, hard or floppy disk, CD-ROM, or the like.

Speaker/earphone 227 is either or both a speaker and an earphone depending on the specific configuration of the dataphone. Both the speaker and the dataphone are configured to convert electrical signals to acoustic signals, typically audible acoustic signals.

Microphone 228 is configured to covert acoustic signals, typically those in the audio band, into electrical signals.

Dataphone 240 connects to the PSTN 200 via a standard telephone jack or connector 202. An incoming signal is processed by line interface circuitry 204 and CODEC 206. The output of the CODEC 206 connects to FSK receiver 208, CAS detector 210, and speaker/earphone 227. The outputs of FSK receiver 208 and CAS detector 210 in turn are connected to controller 212. After processing these outputs, controller 212 provides the processing outputs to display 220, or storage device 229. Display 220 is configured to display the information obtained from the controller. Storage device 229 is configured to store this information.

Speaker/earphone 227 is configured to audibly play the audio information received from CODEC 206.

Controller 212 also connects to user interface 226, FSK generator 222 and CAS generator. The outputs of the FSK generator 222 and CAS generator 224 are connected to CODEC 206, as is the output of microphone 228.

The output of CODEC 206 in turn connects to line interface circuit 204, which in turn connects to PSIN 200 through jack 202.

In one implementation, FSK receiver 208, CAS detector 210, FSK generator 222, CAS generator 224, and controller 212 are implemented on a single chip 230. In one implementation example, each of these components is implemented through suitable software executing on a DSP. In another implementation example, each is implemented through suitable discrete hardware components.

Operation

Figure 4:
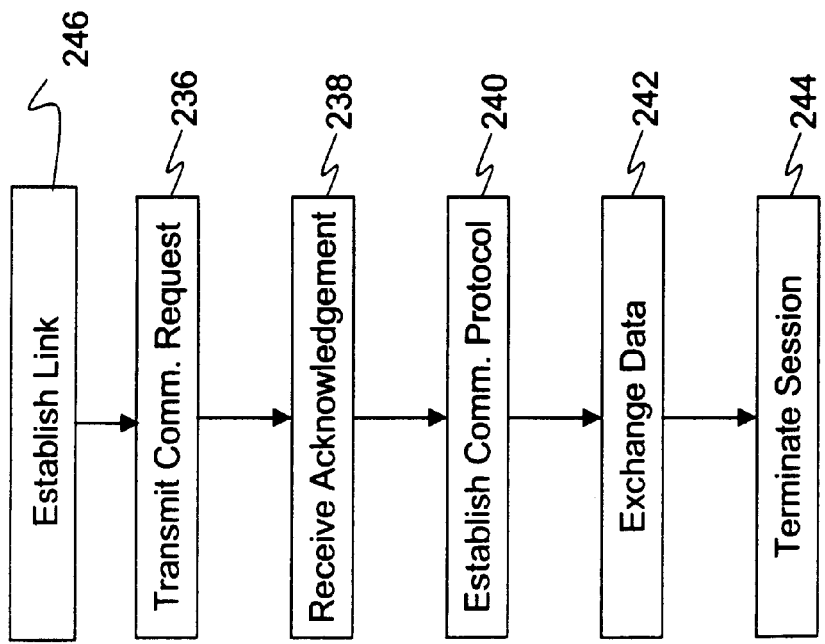
FIG. 4 illustrates an operational flow diagram of one embodiment of the subject invention.

FIG. 4 illustrates a first embodiment of a method of operation of the subject invention. At step 246, a link is established between two dataphones over a telecommunications network such as the PSTN. In one implementation, this link is established when a calling dataphone initiates a call to a target dataphone over a circuit-switching network such as the PSTN, the target dataphone receives the call, and a circuit established between the two dataphones. In one implementation example, the target dataphone receives the call by placing itself in an off-hook condition. In one example, the circuit established between the two dataphone comprises a voice channel, capable of transmitting frequencies with the 300–3400 Hz voice band.

At a step 236, one of the linked dataphones transmits a request for data communication to the other dataphone, referred to herein as the target dataphone, over the link which has been established between the two units in step 246.

At a step 238, the target dataphone, upon receiving the request for data communication from the initiating dataphone, provides an acknowledgment thereof to the initiating dataphone.

At a step 240, a communications protocol is established between the two units. In one implementation, the protocol deviated from the ADSI-compatible protocol.

Thereafter, at a step 242, data is exchanged between the two dataphones over the link which has previously been established between the two in step 246. In one implementation, the data is transmitted between the two in the form of FSK-encoded signals at frequencies within the voice band.

At a step 244 the communication session is terminated. In one implementation, either dataphone may terminate the communication session.

Figure 6A:
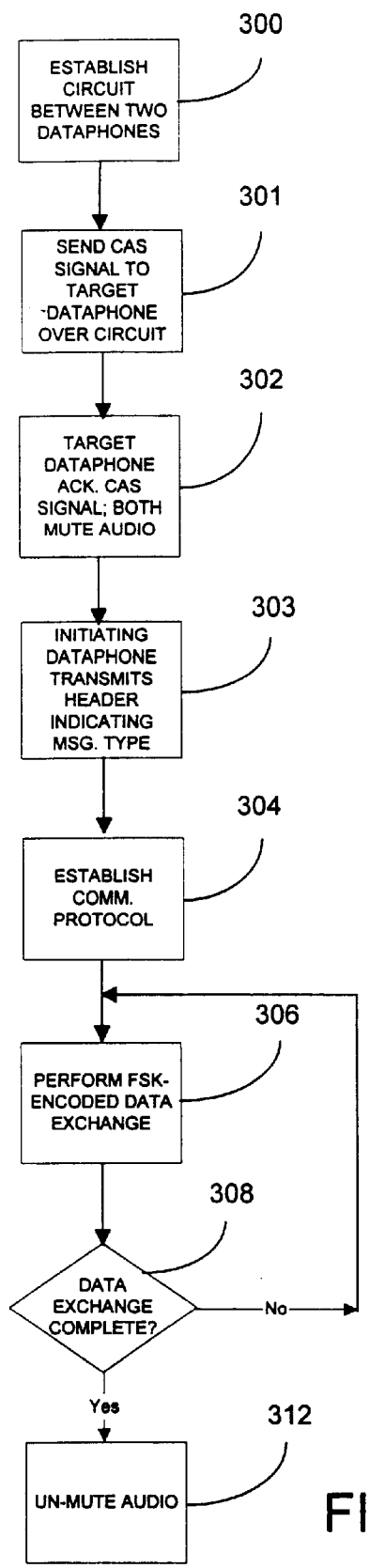
FIGS. 6A–6B illustrate an operational flow diagram of a second embodiment of the subject invention.

FIG. 6A illustrates a second embodiment of a method of operation of the subject invention. In step 300, a circuit is established between two dataphones over a circuit-switching telecommunications network such as the PSTN. In one implementation, the circuit comprises a channel configured to transmit frequencies within the voice band. In one implementation example, the circuit is established when a calling dataphone calls a target dataphone, and the target dataphone receives the call, that is, places itself in an off-hook condition.

In step 301, one of the two linked dataphones desiring to intitate data communication with the other of the two dataphones, sends a CAS signal to the other dataphone over the circuit which has been established between the two in step 300. The initiating dataphone can be either the calling dataphone or the target dataphone referred to above in relation to step 300.

In step 302, the receiving dataphone, upon receiving the CAS signal, sends an acknowledgement to the initiating dataphone over the circuit which has been established between the two. In addition, both units mute the transmission of audio or voice information over the circuit which has been established between the two units. The object is to avoid interference with the data communication which is about to occur. In the case in which the receiving dataphone supports CLASS Type II Caller ID functionality, the acknowledgement signal comprises a DTMF 'D' signal; in the case in which the receiving dataphone supports CLASS Type III Caller ID or ADSI-compatible functionality, the acknowledgement signal is a DTMF 'A' signal.

In step 303, the initiating dataphone transmits header information to the receiving dataphone in the form of FSK0-encoded signals. The FSK-encoded signals are transmitted over the circuit which has been previously established between the two units in step 300. Included in the header is an indicator indicating that the source of the transmission is a dataphone in contrast to a SPCS server.

In step 304, a communications protocol is established between the two units. In one implementation, the protocol can and typically does deviate from the ADSI-compatible protocol. In one implementation example, the protocol which is agreed upon is a simplex mode of operation; in a second implementation example, it is a half-duplex mode of operation.

In step 306, data is exchanged between the two units over the circuit which has been established in step 300. The data which is exchanged is in the form of FSK-encoded signals.

In decision block 308, the process loops back to step 306 while data exchange between the two units is ongoing, and jumps to step 312 when data exchange between the two is complete. In step 312, each units unmutes audio transmission and reception to allow voice communication to occur over the circuit.

Figure 6B:
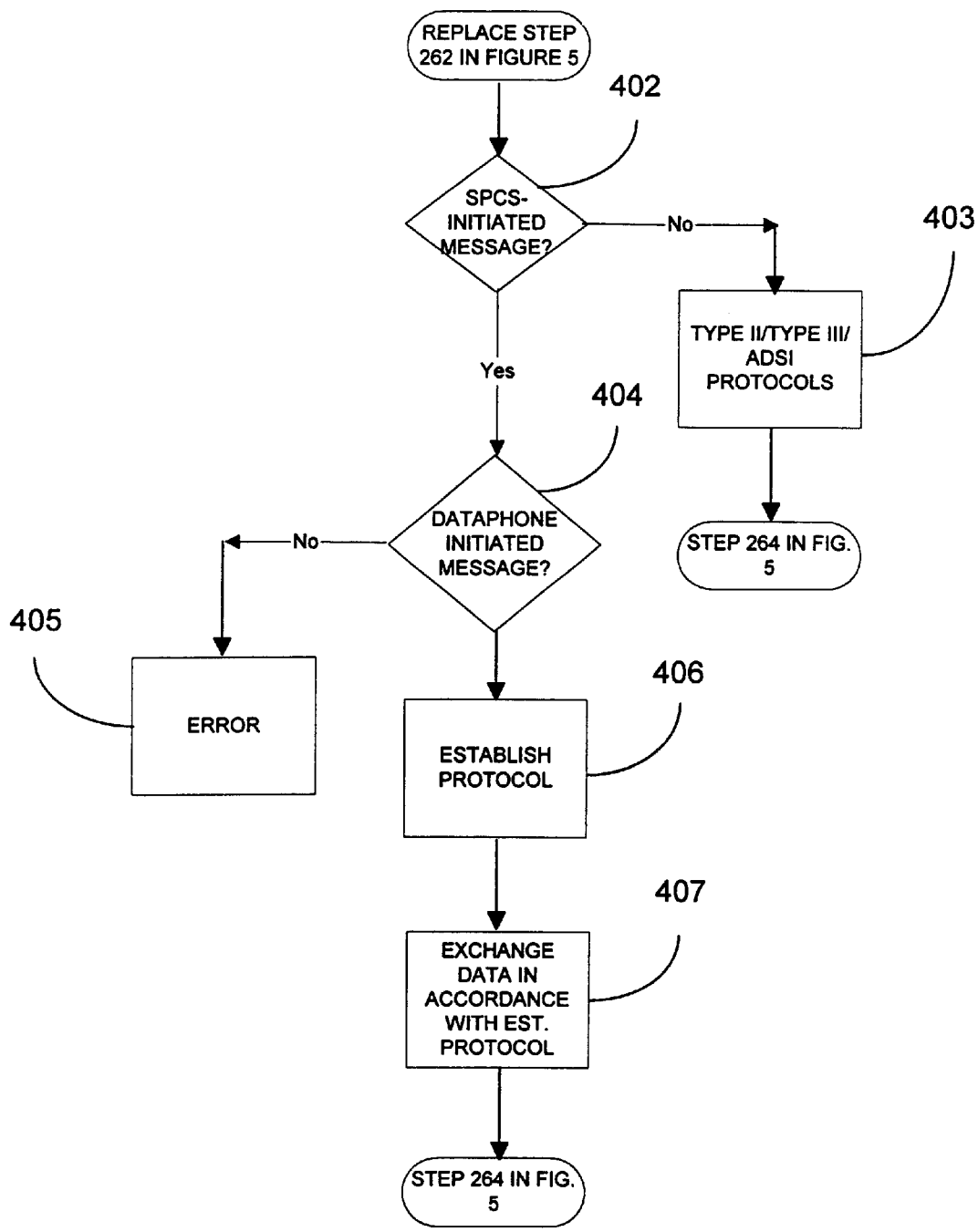

A method of operation of a called dataphone in accordance with the subject invention comprises the method of FIG. 5, with step 262 in FIG. 5 replaced with the steps illustrated in FIG. 6B.

With reference to FIG. 5, as indicated by identifying numeral 250, this process only occurs once a call is in progress, that is, after a voice channel has been established between two dataphones over a telecommunications network such as the PSTN. In one implementation, this channel is established after the called dataphone has been placed in an off-hook condition, either by a user answering a call, or automatically, by the unit itself.

If the dataphone is off-hook, the operation progresses to a step 252 wherein the controller 212 of the receiving dataphone enables the CAS detector 210 thereof. The CAS detector 212 monitors the PSTN interface for CAS signals. In one implementation, the CAS detector remains active during the entire off-hook period.

At step 254, if a CAS signal is not detected, the operation loops and continues to monitor for a CAS signal.

If, at step 254, CAS detector 210 detects a CAS signal, the operation progresses to a step 256 in which the controller 212 mutes the audio path to and from the dataphone. More specifically, controller 212 mutes the speaker/earphone 227 and the microphone 228 to prevent voice communication from being transmitted over the link which has been previously established with the calling dataphone. In addition, in step 256, the controller 212 sends an acknowledgement signal to the calling dataphone. In one implementation, in which the receiving dataphone supports CLASS Type II Caller ID functionality, the acknowledgment signal is a DTMF 'D' signal; in a second implementation, in which the receiving dataphone supports CLASS Type III caller ID functionality, or supports an ADSI-compatible interface, the acknowledgement signal is a DTMF 'A' signal.

Next, at a step 258, the controller 212 enables the FSK detector 208 in anticipation of the reception of FSK-encoded data. At a step 260, the operation loops and continues to monitor for incoming FSK-encoded data. If the FSK detector 208 does not receive the FSK-encoded data within a predetermined time-out period, the operation progresses to a step 264, in which the controller 212 un-mutes the audio path within the dataphone to permit voice communication over the link which has been established between the two units.

If, at step 260, the FSK detector 208 detects incoming FSK-encoded data within the prescribed timeout period, the steps illustrated in FIG. 6B are performed.

In step 402, the controller 212 analyzes the header of the FSK-encoded data stream. Included therein is an indicator indicating the origin of the data stream, whether from a SPCS server or a dataphone. In one configuration, the indicator is a message type (T) byte which indicates the source of the FSK-encoded data. Such is consistent with the standard ADSI protocol, which allows for manufacturer specific message types.

In step 402, if the indicator indicates that the data stream originated from a SPCS server, then step 403 is performed. In step 403, the pre-existing Type II and Type III caller ID or ADSII-compatible protocols are performed depending on whether the receiving dataphone supports CLASS caller ID Type II functionality, CLASS caller ID Type III functionality, or ADSI-compatible functionality. When this has been accomplished, a jump is made to step 264 in FIG. 5.

In step 402, if the message is not SPCS-initiated, a jump is made to step 404. In step 404, a determination is made whether the message originated from a dataphone. If not, step 405 is performed, and an error condition indicated. If so, step 406 is performed.

In step 406, a communications protocol is established between the two dataphones. In one configuration, the protocol may deviate from the ADSI-compatible protocol. In one implementation, the steps involves selecting a transmission mode from a plurality of predetermined transmission modes, such as, for example, simplex, half duplex, and full duplex modes of operation. According to the simplex mode of operation, only the initiating dataphone transmits data, and the communication session is terminated after the data has been exchanged with the receiving dataphone. According to the half-duplex mode of operation, the initiating and receiving dataphones alternately but not simultaneously transmit data to one another during a communication session. In a full duplex mode of operation, the initiating and receiving dataphones transmit data to one another simultaneously during a communication session.

In an example implementation of asynchronous data transfer using FSK signals, the center carrier frequency of 1,170 Hz is shifted to 1,270 Hz for a digital '1' value and to 1,070 Hz for a digital '0' value. This example implementation frequency selection is available for simplex and half-duplex transmission.

Figure 10:
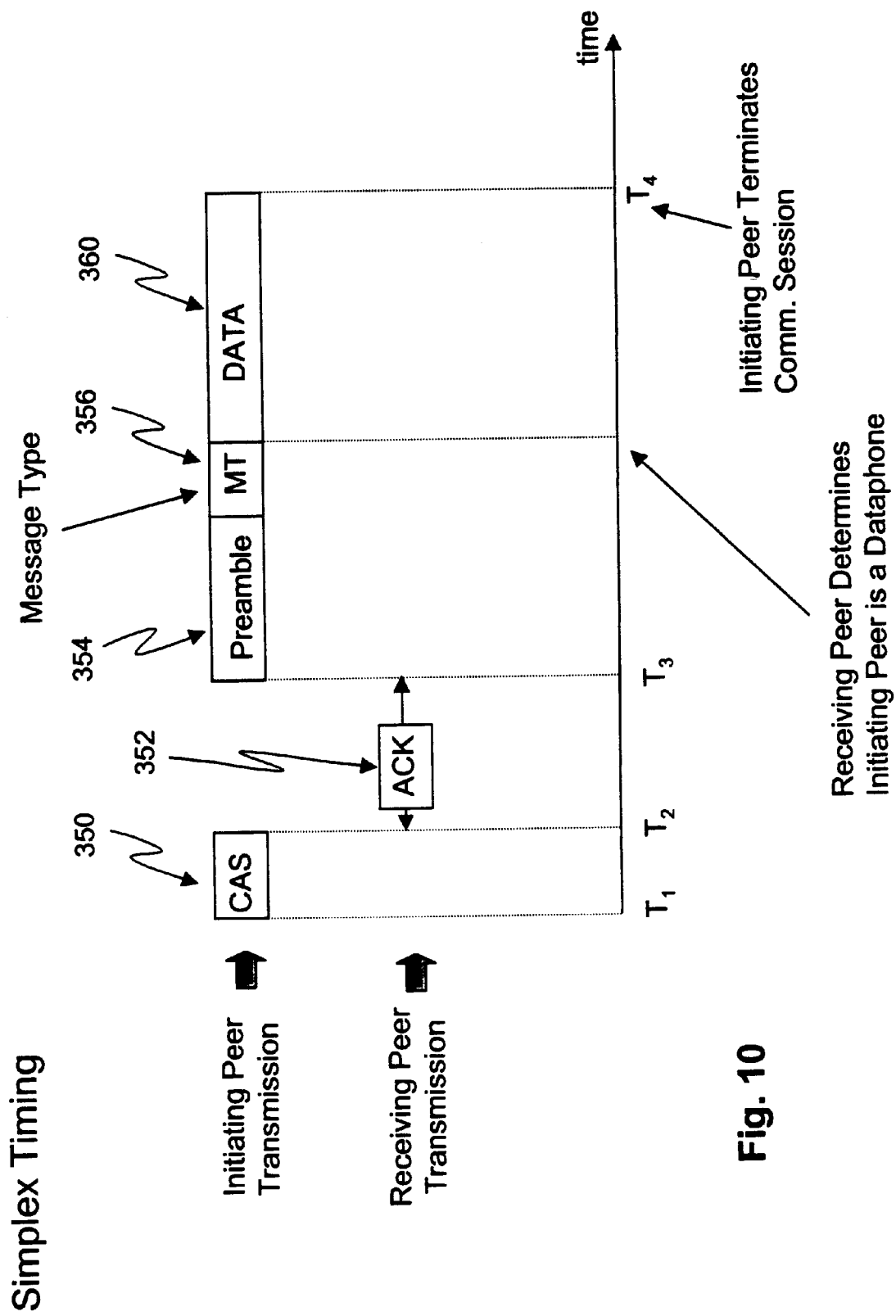
FIG. 10 illustrates an exemplary timing diagram for simplex data transmission in accordance with the subject invention.

FIG. 10 illustrates an exemplary timing diagram consistent with a simplex mode of operation. At a time $T_1$, the initiating peer transmits a CAS signal 350 receiving dataphone on a channel previously established between the two. This indicates to the receiving peer that another device on the network is requesting a data communication session with it.

Next, at a time $T_2$, the receiving peer acknowledges the request for a data communication session using a predetermined acknowledgment signal 352. Thereafter, at a time $T_3$, the initiating peer transmits a header, which in one configuration comprises a preamble 354 followed by a MT byte 356 indicating that the data stream is originating with a dataphone or other CPE in contrast to a SPCS server. This is followed by the FSK-encoded data 360. In one implementation, the MT byte also communicates additional information to the receiving peer, such as the type of CPE which is initiating the session, and the protocol for data exchange which will be employed. In one configuration, the MT byte indicates whether a simple, half-duplex, or full-duplex mode of operation will be employed. Upon receipt of the header, the receiving peer determines that the data is originating with a peer CPE, an receives the FSK-encoded data. When this has been accomplished, the session terminates at time $T_4$.

Figure 11:
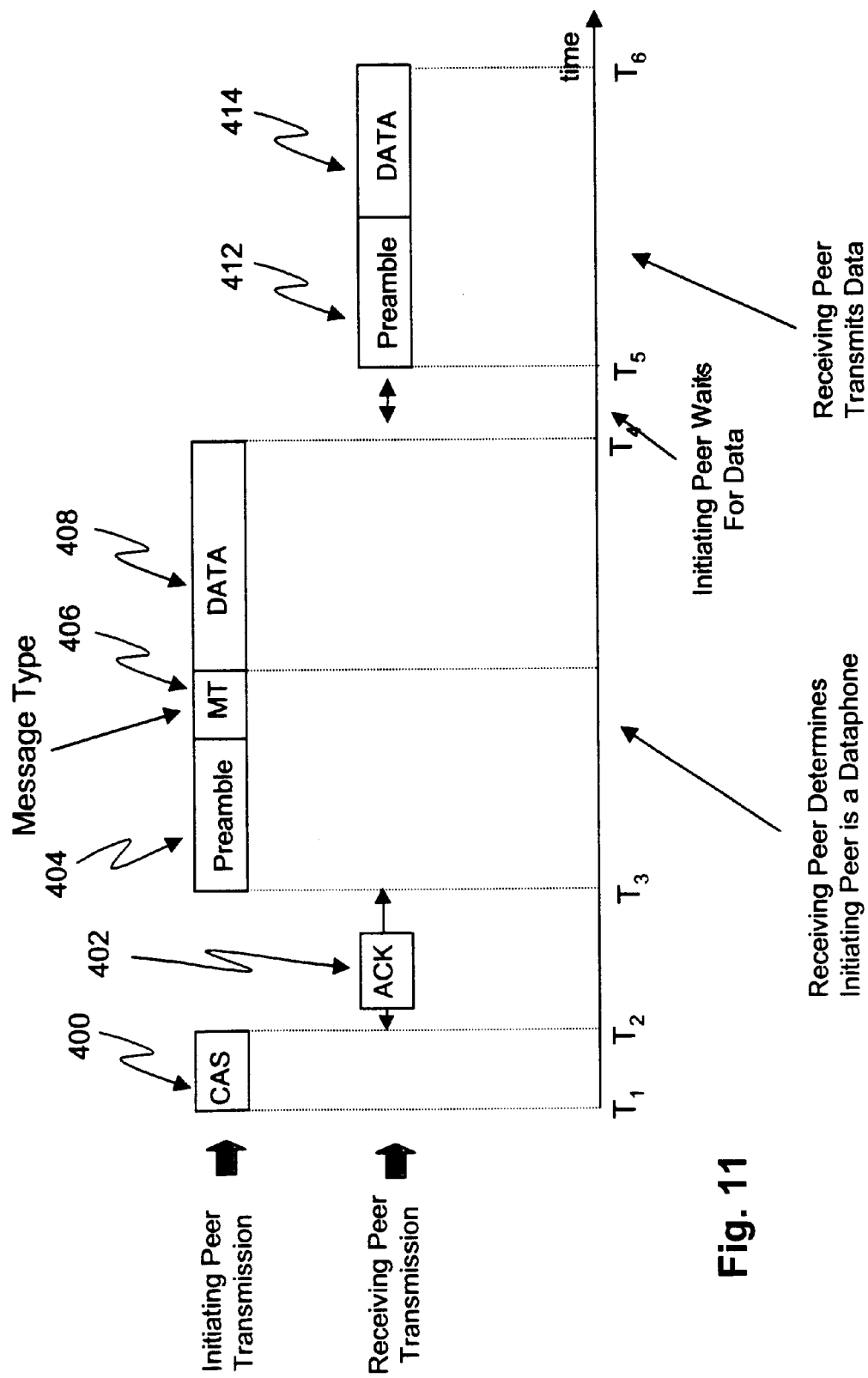
FIG. 11 illustrates an exemplary timing diagram for half-duplex data transmission in accordance with the subject invention.

FIG. 11 illustrates an exemplary timing diagram consistent with a half-duplex mode of operation. At a time $T_1$, the initiating peer transmits a CAS signal 400 to the receiving peer on the channel which has been previously established between the two. This indicates to the receiving peer that a device on the network is requesting a data communication session with it. At time $T_2$, the receiving peer responds with an acknowledgment signal 402. At time $T_3$, the initiating peer responds with a data stream comprising a preamble 404, a MT byte 408, and data 408. Again, the MT byte indicates to the receiving peer that the data stream originates from a peer dataphone or other CPE in contrast to a SPCS server. In addition, it optionally indicates the type of CPE which is originating the data, and the communication protocol that will govern the session. In one configuration, it indicates that the communication mode is half-duplex.

Upon completion of data transmission at time $T_4$, control of the channel passes to the receiving peer which, after a short wait period, that is, at time $T_5$, initiates data transmission with the initiating peer. Consequently, beginning at time $T_5$, the receiving peer transmits to the initiating peer a data stream comprising preamble 412 and data 414. At time $T_6$, this step is completed. At this point, the data communication session may terminate, or control of the channel may alternates back and forth between the initiating and receiving peers until the data communication session has been completed.

For full-duplex transmission, the FSK modulation is accomplished by dividing the available bandwidth into bands. A lower frequency band carries data in one direction and an upper frequency band carries data in another direction. The lower band center frequency in this example embodiment is 1,170 Hz. The lower band frequency is shifted to 1,270 Hz for a digital '1' and to 1,070 Hz for a digital '0'. The upper band center frequency is 2,125 Hz. The upper band frequency is shifted to 2,225 Hz for a digital '1' and to 2,025 Hz for a digital '0'.

Next, in step 407, FSK-encoded data is exchanged between the initiating and receiving dataphones in accordance with the protocol established in step 406.

When data exchange between the two units has been completed, the operation jumps to step 264 in FIG. 5. In step 264, the audio path in the dataphone is unmuted, and voice communication allowed to continue or proceed over the channel which was previously established between the two units.

4. Second Embodiment

In a second embodiment, data transmission between the two units occurs independent of the telecommunication network, and over an acoustical channel. In this embodiment, consistent with the Type II, Type III, and ADSI-compatible protocols, information is transmitted between the two units at frequencies within the voice band. In one implementation, these frequencies range from 500–2500 Hz. In another implementation, they range from 1000–2200 Hz. The acoustical channel comprises the speaker/earpiece of the originating dataphone, and extends through the air to the microphone of the destination dataphone. The information is converted to FSK signals by the FSK generator of the originating dataphone. It is then converted to an acoustic signal by the speaker/earpiece of the originating dataphone, and transmitted over the air. The acoustic signal is received by the microphone of the destination dataphone, which converts it back into electrical FSK signals. These electrical signals are then processed as in the first embodiment. Compared to the first embodiment, neither of the two dataphones need to be in an off-hook condition to establish the link, although the speaker/earpiece of the originating dataphone and the microphone of the destination dataphone do generally need to be in a line-of-sight relationship.

5. Third Embodiment

In a third embodiment, a CPE is any device which is capable of placing calls to other similarly disposed units over a telecommunication network such as the PSTN, which further has a CAS generator and detector, and a FSK generator/detector, and which is configured to communicate FSK-encoded data over a pre-established link with a similarly disposed device. Such devices may include laptops, desk top computers, and palm pilots.

Figure 8:
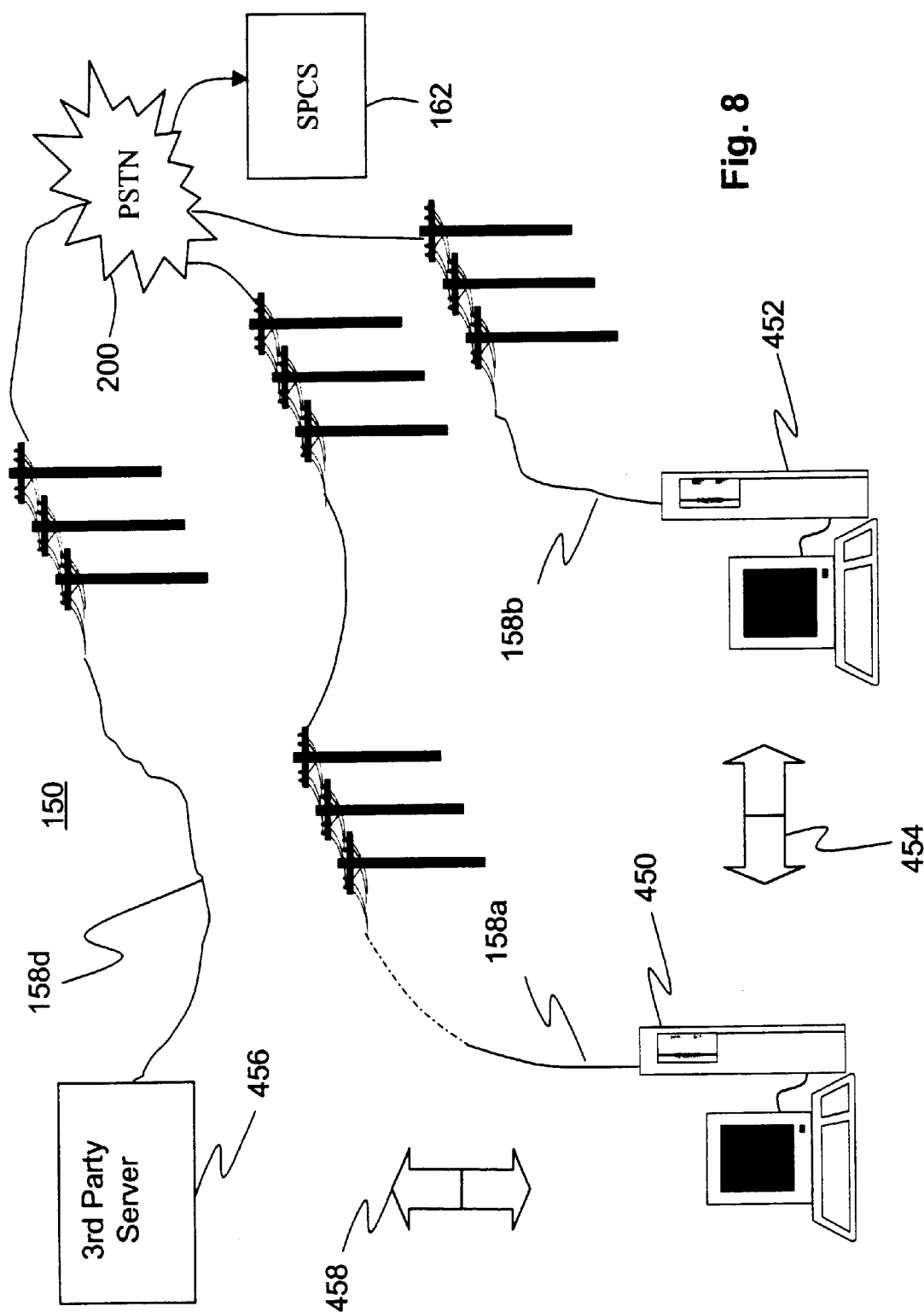
FIG. 8 illustrates a third embodiment of the subject invention.

FIG. 8 illustrates an example of the third embodiment in which, compared to FIG. 2, like elements are referenced with like reference numeral. As illustrated in FIG. 8, a telecommunications network 400 links two or more CPEs 450, 452, each of which is a personal computer. CPE 450 is linked to the PSTN 200 over line 158a, and CPE 452 is linked to the PSTN 200 over line 158b. Included within the PSTN is an SPCS server, identified with numeral 162.

Each of the CPEs 450,452 is configured with a CLASS Caller ID capability in which each unit is configured to receive CLASS Caller ID signals from SPCS server 162, to decode the signals to obtain the underlying information, and display the information on displays within each device.

In one implementation, each CPE 450, 452 is a Type II or Type III unit, that is, a unit configured with a CAS detector and a FSK receiver which are configured to 1) detect and acknowledge a CAS signal from SPCS server 162; 2) thereafter detect CLASS Caller ID FSK signals originating from the SPCS server 162; and 3) display the caller ID information, all in accordance with the previously discussed Type II and Type III procedures (see FIG. 5 and the related text for a description of the Type II and Type III procedures).

In a second implementation, each CPE 450, 452 is an ADSI-compatible unit, that is, a unit configured with a CAS detector, an FSK receiver, and an FSK generator, which are configured to 1) detect and acknowledge a CAS signal from SPCS server 162; 2) thereafter detect CLASS Caller ID FSK signals originating from SPCS server 162; 3) display the caller ID information, all in accordance with the previously discussed Type III procedures; and 4) exchange information encoded in the form of CLASS FSK signals with SPCS server 162 in accordance with ADSI-interface protocols.

In addition, the CPEs 450, 452 are configured to communicate FSK-encoded to one another in accordance with the subject invention, as indicated by the bi-directional arrow identified with numeral 454.

Also shown in FIG. 8 is a $3^{rd}$ party server 456, which is linked to PSTN 200 by means of line 158d. The $3^{rd}$ party server 456 is configured to provide one or more services to CPEs 450, 452, including, for example, computer hardware or software diagnostic services, weather information, stock market information, news information, Internet security codes, sports reports, business information such as hours, prices, store locations, or other similar data.

In one configuration, the $3^{rd}$ party server also includes a CAS detector, CAS generator, FSK detector, and FSK generator, and is configured to communicate FSK-encoded data with either of CPEs 450, 452 in accordance with the principles of the subject invention.

6. Fourth Embodiment

In a fourth embodiment, the calling and target CPEs are each a wireless communication device, such as a mobile handset, which further has a CAS generator and detector, and a FSK generator and detector, and which is configured to communicate FSK-encoded data over a predefined wireless link with a similarly disposed device.

Figure 9:
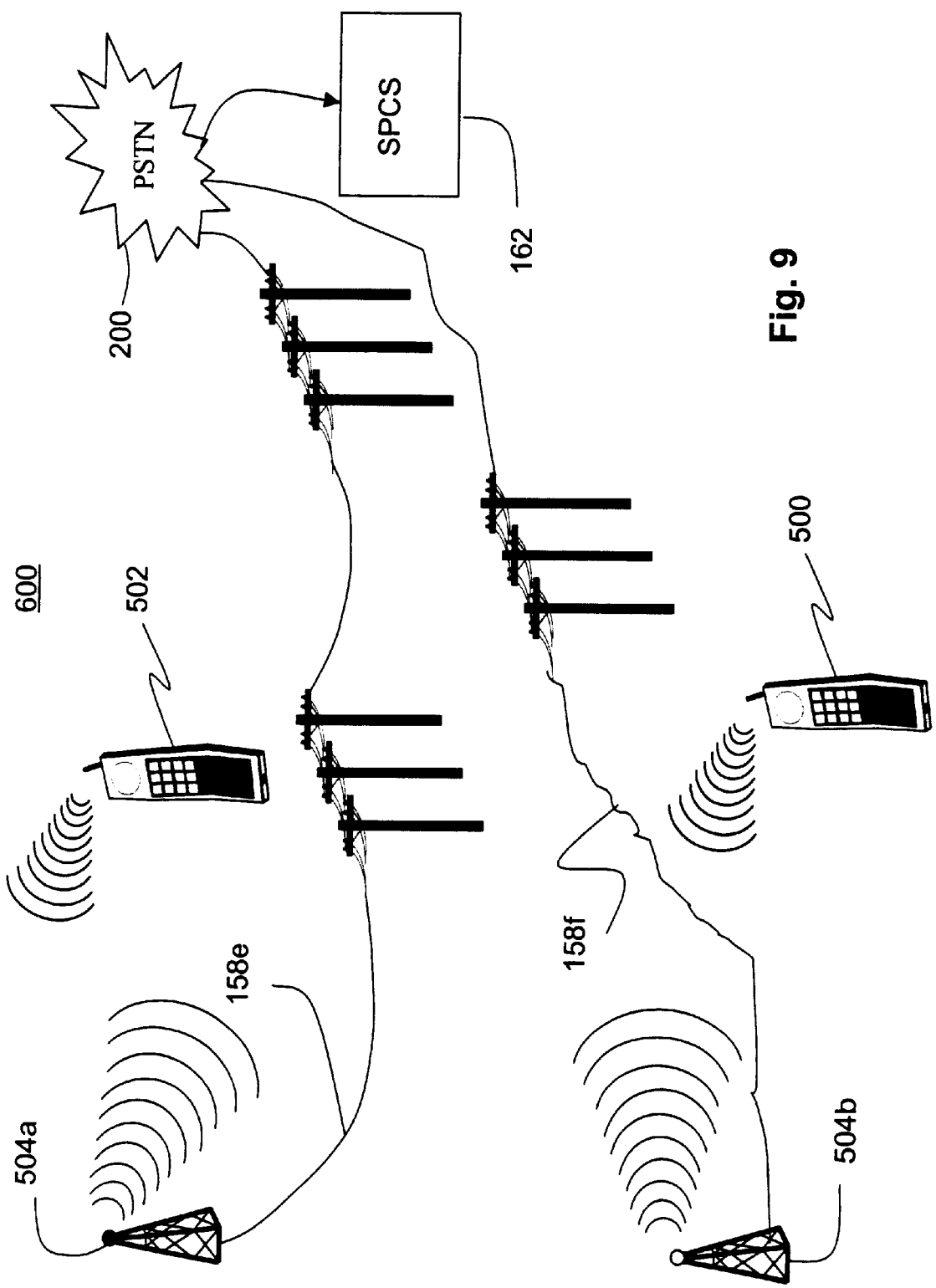
FIG. 9 illustrates a fourth embodiment of the subject invention.

FIG. 9 illustrates an example implementation of the fourth embodiment. In relation to FIG. 2, like elements in FIG. 9 are referenced with like identifying numerals.

As illustrated in FIG. 9, a telecommunications network 600 links two or more CPEs 500, 502, each of which is a mobile wireless communication handset. CPE 500 is linked to the PSTN 200 by means of a wireless interface between CPE 500 and base station 504b, and line 158f linking base station 504b to the PSTN 200. CPE 502 is linked to the PSTN 200 by means of a wireless communications interface between CPE 502 and base station 504a, and line 158e linking the base station 504a with the PSTN 200. Included within the PSTN is an SPCS server, identified with numeral 162.

Each of the CPEs 500, 502 is configured with a CLASS Caller ID capability in which each unit is configured to receive CLASS Caller ID signals from SPCS server 162, to decode the signals to obtain the underlying information, and display the information on displays within each device.

In one implementation, each CPE 500, 502 is a Type II or Type III unit, that is, a unit configured with a CAS detector and a FSK receiver which are configured to 1) detect and acknowledge a CAS signal from SPCS server 162; 2) thereafter detect CLASS Caller ID FSK signals originating from the SPCS server 162; and 3) display the caller ID information, all in accordance with the previously discussed Type II and Type III procedures (see FIG. 5 and the related text for a description of the Type II and Type III procedures).

In a second implementation, each CPE 500, 502 is an ADSI-compatible unit, that is, a unit configured with a CAS detector, an FSK receiver, and an FSK generator, which are configured to 1) detect and acknowledge a CAS signal from SPCS server 162; 2) thereafter detect CLASS Caller ID FSK signals originating from SPCS server 162; 3) display the caller ID information, all in accordance with the previously discussed Type III procedures; and 4) exchange information encoded in the form of CLASS FSK signals with SPCS server 162 in accordance with ADSI-interface protocols.

In addition, the CPEs 500, 502 are configured to communicate FSK-encoded data to one another in accordance with the subject invention.

7. Advantages

A number of new applications are made possible by means of the subject invention. One example is the use of the subject invention to remotely access a telephone from another telephone to obtain a listing of those who have called the remote telephone within a prescribed time period. A second example is the use of the subject invention to remotely access a telephone from a laptop or other computer in order to activate dormant functionality in the remote telephone through the setting of appropriate bits. A third example is the use of the subject invention to remotely access a computer from another computer in order to run diagnostics and the like on the remote computer.

While particular embodiments and examples of the present invention have been described above, it should be understood that they have been presented by way of example only and not as limitations. Those of ordinary skill in the art will readily appreciate that other various embodiments or configurations adopting the principles of the subject invention are possible. The breadth and scope of the present invention is defined by the following claims and their equivalents, and is not limited by the particular embodiments described herein.

What is claimed is:

1. A communication device comprising:
an interface to a telecommunications network;
a controller configured to direct operation of the device;
a FSK receiver for 1) receiving and decoding FSK-encoded CLASS caller ID information from the telecommunications network when the controller determines that the FSK-encoded information originated from a caller ID server; and 2) receiving and decoding FSK-encoded data from a peer device over a channel previously established between the communication device and the peer device when the controller determines that the FSK-encoded data originated from the peer device;
a FSK generator for FSK-encoding data, and transmitting the FSK-encoded data to a peer device over a channel previously established between the communication device and the peer device.

2. The device of claim 1 wherein the interface comprises a PSTN interface.

3. The device of claim 1 wherein the interface comprises a wireless communications interface.

4. The device of claim 1 further comprising means for muting voice transmission over the voice channel.

5. The device of claim 4 further comprising a CAS detector configured to detect a CAS signal received over the telecommunications network.

6. The device of claim 1 further comprising a CAS generator configured to generate a CAS signal and transmit the CAS signal over the voice channel to the peer device.

7. The device of claim 1 wherein the channel is an acoustic channel.

8. The device of claim 1 further comprising means for establishing a voice channel over the telecommunications network with a peer device.

9. The device of claim 1 further configured to exchange data with a peer device in accordance with a desired protocol which may differ from the ADSI-standard.

10. The device of claim 9 wherein the desired protocol is selected responsive to an indicator in or preceding the data provided by the peer device.

11. The device of claim 1 wherein the desired protocol is selected from a group including simplex and half-duplex modes of operation.

12. The device of claim 11 wherein the group further includes full duplex mode of operation.

13. A communications system comprising:
a plurality of devices having a peer relationship to one another;
means for establishing a voice channel between any two of the devices over a telecommunications network;
each such device comprising:
a controller configured to direct operation of the device;
a FSK receiver for 1) receiving and decoding FSK-encoded CLASS caller ID information from the telecommunications network when the controller determines that the FSK-encoded information originated from a caller ID server; and 2) receiving and decoding FSK-encoded data from a peer device over a voice channel previously established between the devices over the telecommunications network when the controller determines that the FSK-encoded data originated from the peer device;
a FSK generator for FSK-encoding data, and transmitting the FSK-encoded data to a peer device over a voice channel previously established between the two devices.

14. A method of operation of a called device using pre-existing CLASS caller ID protocol comprising the following steps:
(a) establishing an interface with a calling device;
(b) monitoring the interface for incoming FSK-encoded data;
(c) when FSK-encoded data is detected, analyzing the FSK-encoded data to determine whether it came from a caller ID server or the calling device;

(d) if the FSK-encoded data came from a caller ID server, performing the pre-existing CLASS caller ID protocol to decode and display incoming caller ID information; and (e) if the FSK-encoded data came from the calling device, establishing a communications protocol between the two devices to permit data exchange between the two devices.

15. A method as claimed in claim 14, wherein in step (c) a header attached to the FSK-encoded data indicates whether the data came from a caller ID server or the calling device.

16. A method as claimed in claim 14, wherein the communications protocol in step (e) is selected from a group of transmission modes comprising simplex, half duplex and full duplex transmission modes.

17. A method as claimed in claim 14, wherein the called and calling devices are each dataphones, and wherein in step (e) the calling dataphone obtains from the called dataphone a listing of those that have called the called dataphone within a prescribed time period.

18. A method as claimed in claim 14, wherein the called device is a dataphone and the calling device is a computer, and wherein in step (e) the computer activates dormant functionality in the dataphone through the setting of appropriate bits.

19. A method as claimed in claim 14, wherein the called and calling devices are each computers, and wherein in step (e) the calling computer performs diagnostics on the called computer.

20. A method as claimed in claim 14, wherein the interface established in step (a) is an acoustical channel comprising a speaker of the calling device and a microphone of the called device.

* * * * *